United States Patent [19]

Kageura

[11] Patent Number: 4,931,924
[45] Date of Patent: Jun. 5, 1990

[54] DATA TRANSFER SPEED CONTROL APPARATUS CAPABLE OF VARYING SPEED OF DATA TRANSFER BETWEEN DEVICES HAVING DIFFERENT TRANSFER SPEEDS

[75] Inventor: Kenichi Kageura, Fujisawa, Japan

[73] Assignee: Hitachi, Ltd., Tokyo, Japan

[21] Appl. No.: 133,805

[22] Filed: Dec. 16, 1987

[30] Foreign Application Priority Data

Dec. 19, 1986 [JP] Japan .................. 61-301817

[51] Int. Cl.⁵ ..................... G06F 5/06; G06F 3/00
[52] U.S. Cl. ..................... 364/200; 364/238.4; 364/260.1; 364/228.1; 364/243
[58] Field of Search ... 364/200 MS File, 900 MS File

[56] References Cited

U.S. PATENT DOCUMENTS

| | | | |
|---|---|---|---|
| 3,937,938 | 2/1976 | Matthews | 364/200 |
| 3,980,993 | 9/1976 | Bredart et al. | 364/200 |
| 4,344,132 | 8/1982 | Dixon et al. | 364/200 |

OTHER PUBLICATIONS

Microprocessor Interfacing, 1982-Prof. Andrew C. Staugaard, Jr.

Primary Examiner—Thomas M. Heckler
Assistant Examiner—Gopal C. Ray
Attorney, Agent, or Firm—Antonelli, Terry, Stout & Kraus

[57] ABSTRACT

A data transfer speed control apparatus for effecting data transfer between semiconductor storage devices and CPU channel devices having maximum transfer speeds different from each other has connection line setting sections indicating the maximum transfer speeds of the semiconductor storage devices and the CPU channel devices. When data transfer between one of the semiconductor storage devices and one of the channel devices is to be made, a transfer speed determining section determines an actual speed of data transfer between the one semiconductor storage device and the one channel device on the basis of the indicated maximum transfer speeds of the one semiconductor storage device and the one channel device to be that one of both the maximum transfer speeds which is lower. The transfer speed of the semiconductor storage device and the channel device is set to the transfer speed determined by the transfer speed determining section.

13 Claims, 2 Drawing Sheets

FIG. 2

DETERMINATION OF
DATA TRANSFER SPEED

| SSU \ CHANNEL DEVICE | CHANNEL DEVICE (6MB/S) | CHANNEL DEVICE (3MB/S) |
|---|---|---|
| SSU 10 (6MB/S) | 6MB/S | 3MB/S |
| SSU 11 (3MB/S) | 3MB/S | 3MB/S |

4,931,924

DATA TRANSFER SPEED CONTROL APPARATUS CAPABLE OF VARYING SPEED OF DATA TRANSFER BETWEEN DEVICES HAVING DIFFERENT TRANSFER SPEEDS

BACKGROUND OF THE INVENTION

This invention relates to a data transfer speed control apparatus capable of varying speed data transfer speed between two devices, depending on the data transfer speeds of the two devices, and in particular to a data transfer speed control apparatus, which is suitable for the data transfer between devices the data transfer speeds of which are different or can be arbitrarily set, e.g. between a semiconductor storage device, such as an IC disc, etc., and a device of higher rank therefor.

As prior art techniques for mutually transferring data between two devices having different data sending-/receiving speeds are known those disclosed by, for example "IBM 3380 Storage Control Models 1, 2, 3 and 4 Description Manual" (published 1985) p. 5-15 "Speed Matching Buffer for 3380", p. 5-14 "Speed Matching Buffer for 3375". According to these prior art techniques, e.g. in the case where data are mutually transferred between a channel device and a disc device, the difference in the data transfer speed between the channel device and the disc device is absorbed by disposing a large capacity data buffer within a control device controlling the disc device and by temporarily storing the data transferred between the channel device and the disc device in this data buffer.

SUMMARY OF THE INVENTION

An object of this invention is to provide a data transfer speed control apparatus by which data transfer between a channel device and a storage device can be in synchronism with each other and at the same speed equal to the maximum data transfer speed which is possible or available between the channel device and the storage device.

Another object of this invention is to provide a data transfer speed control apparatus which is suitable for the data transfer between a semiconductor storage device, such as an IC disc, having no rotating mechanism for the data storage medium and hence a transfer speed which can be varied, and a channel device.

Still another object of this invention is to provide a data transfer system within a computer requiring neither a large capacity data buffer in a control device nor complicated buffer control logic for controlling this data buffer.

Still another object of this invention is to provide a data transfer system, which is capable of eliminating deviations between the channel side operation and the disc side operation in the case where the troubles are produced and reporting the troubles to the channel at the proper timing at which the troubles are to be originally reported.

Still another object of this invention is to provide a data transfer system in which semiconductor storage devices having different transfer speeds can be connected with a control device for controlling the data transfer between a channel device and the semiconductor storage devices.

Still another object of this invention is to provide a storage subsystem within a computer capable of determining the data transfer speed after having fixed a data transfer path.

According to this invention the objects described above can be achieved in such a manner that a semiconductor storage subsystem in a computer system of the like is provided with which indicates or displays the maximum transfer capacity of each of plurality of channel devices and a plurality of semiconductor storage devices connected with a semiconductor storage control device and a mechanism which upon data transfer between one of the storage devices and one of the channel devices, the data transfer speed of each of the one storage device and the one channel device can be set to that one of the maximum transfer speeds of both the devices which is lower.

When the semiconductor storage control device receives an instruction to transfer data from one of the channel devices to one of the semiconductor storage devices, it reads out the indicated maximum transfer speed of the one channel device and the indicated maximum transfer speed of the one semiconductor storage device within the semiconductor storage control device and decides to transfer the data with the lower one of the maximum transfer speeds of the channel device and the semiconductor storage device, that i, the maximum speed which is possible or available between the channel device and the semiconductor storage device. A transfer speed determining logic section within the semiconductor storage control device sets the decided transfer speed in a transfer speed setting section for channel device and in a transfer speed setting section for semiconductor storage device within the semiconductor storage device. In this way, the channel device and the semiconductor storage device carry out mutually the data transfer in synchronism with each other and at the decided data transfer speed through the semiconductor storage control device.

Since the channel device and the semiconductor storage device can work so as to effect data transfer therebetween at the same speed in synchronism with each other, it is not required that the semiconductor storage control device is provided with a large capacity data buffer for absorbing speed difference in the speed between the channel device and the semiconductor storage device as well as any controller for controlling the data buffer. Furthermore, when a trouble or fault is produced, it is possible to report the trouble at a correct timing.

BRIEF DESCRIPTION OF THE DRAWINGS

FIG. 2 is a scheme for explaining how the data transfer speed is determined for a combination of a channel device and a semiconductor storage device.

DESCRIPTION OF THE PREFERRED EMBODIMENTS

Figure 1:
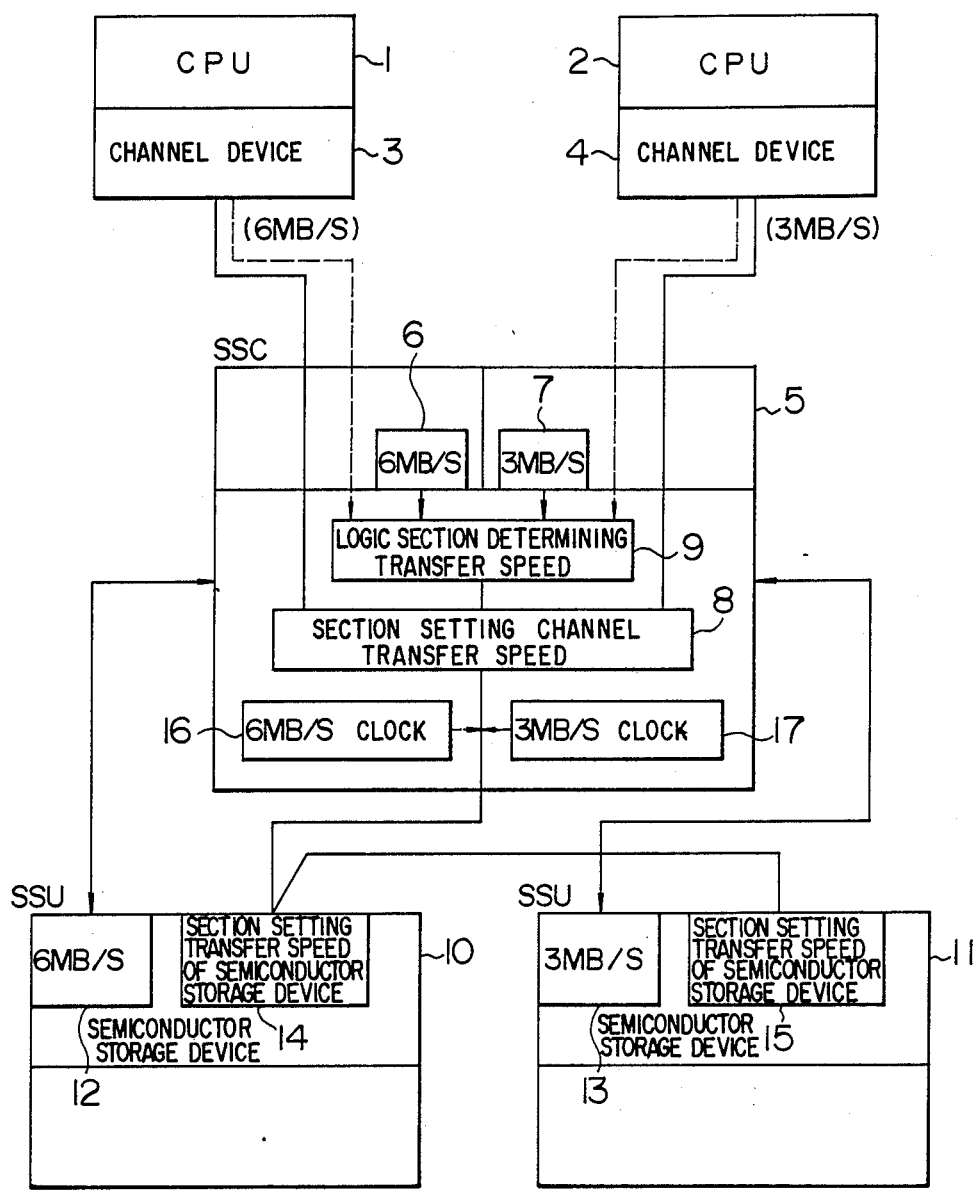
FIG. 1 is a block diagram illustrating the construction of an embodiment, in which this invention is applied to a semiconductor storage subsystem.

An embodiment of a data transfer speed control apparatus according to this invention will now be explained by virtue of the accompanying drawings.

In FIG. 1 reference numerals 1 and 2 are CPUs; 3, 4 are channel devices; 5 is a semiconductor storage control device; 6, 7 are sections indicating or displaying the maximum transfer speeds of channel devices 3 and 4; 8 is a section setting actual transfer speeds of channel devices 3 and 4; 9 is a logic section determining a speed of data transfer to be actually made; 10, 11 are semiconductor storage devices; 12, 13 are sections displaying the maximum transfer speeds of semiconductor storage devices 10 and 11; and 14, 15 are sections setting actual transfer speeds of the semiconductor storage devices 10 and 11.

FIG. 1 shows the construction of a semiconductor storage subsystem in a computer system, to which this invention is applied. This semiconductor subsystem includes two semiconductor storage devices (hereinbelow abbreviated to SSU) 10 and 11 connected to a semiconductor storage control device (hereinbelow abbreviated to SSC) 5 and two channel devices 3 and 4 disposed in CPUs 1 and 2, respectively. The maximum data transfer speed is 6 MB/s (megabytes/second) for the channel device 3 and the SSU 10 and 3 MB/s for the channel device 4 and the SSU 11. The maximum data transfer speeds of the channel devices 3 and 4 are indicated by the channel maximum transfer speed indicating sections 6 and 7, respectively and the maximum data transfer speeds of the SSUs 10 and 11 are indicated by the SSU maximum transfer speed indicating sections 12 and 13 within the SSUs 10 and 11, respectively. These indications or displays are effected in such a manner that, in the step of connecting the relevant channel devices and the relevant semiconductor storage devices, jumper lines are mounted, only at those places of a plurality of connection line setting sections disposed on the channel maximum transfer speed indicating sections 6 and 7 within the semiconductor storage control device 5 which correspond to the specifications of the relevant channel devices and at those places of a plurality of connection line setting sections disposed on the relevant semiconductor storage devices 10 and 11 which correspond to the specifications of the relevant semiconductor devices. It is preferable to effect the mounting of the jumper lines on a circuit board.

Either one of the channel devices 3 and 4 can transmit a data transfer demand to the SSUs 10 and 11 through the SSC 5. Now it is supposed that the channel device 3 transmits the data transfer demand to the SSU 11. When the SSC 5 receives the data transfer demand from the channel device 3 to the SSU 11 through a control line indicated by a broken line in FIG. 1, the transfer speed determining logic section 9 within the SSC 5 reads out the channel maximum transfer speed indicating section 6 corresponding to the channel device 3 and knows that the channel device 3 has a data transfer capacity of 6 MB/s. Next it reads out the SSU maximum transfer speed indicating section 13 within the SSU 11 after having set a path to the SSU 11 and knows that the SSU 11 has a data transfer capacity of only 3 MB/s. The transfer speed determining logic section 9 decides to effect the data transfer with a data transfer speed of 3 MB/s, which is the lower one, and sets the data transfer speed of 3 MB/s in each of the channel transfer speed setting section 8 and the SSU data transfer speed setting section 15 within the SSU 11. In this way, the channel device 3 and the SSU 11 work with the data transfer speed of 3 MB/s to effect the data transfer in synchronism with each other by using a data line indicated by a full line in the figure through the SSC 5.

The SSC 5 decides an optimum data transfer speed, depending on the combination of the channel devices 3, 4 and the SSUs 10, 11, in the same way as stated previously, so that transfer data between the combined channel device and SSU is effected with the optimum speed.

The data transfer speed decided by the combination of the channel devices 3, 4 and the SSC 10, 11 in the embodiment indicated in FIG. 1 is indicated in FIG. 2. The data transfer speed is 6 MB/s for the combination of the channel device 3 and the SSU 10 and it is 3 MB/s for all the other combinations.

The indication of data transfer speed may also be achieved by mounting a group of microswitches on the connection line setting sections and turning-on only the switches corresponding to the data transfer speeds of the channel device and the semiconductor storage device connected with each other.

Although in the above a pair of 3 MB/s and 6 MB/s is described as the kind of data transfer speeds, it is of course possible to use a semiconductor storage subsystem provided with another combination of other speeds such as 1.5M, 3M, 4.5M, 6M, . . . B/s.

Further, the name of type of storage capable of specifying the data transfer speed of the semiconductor storage device may be set in a coded form in the connection line setting section of the semiconductor storage device.

In the above, this invention has been explained, supposing that the number of the maximum data transfer speeds of the devices is 2 in an embodiment, in which this invention is applied to a semiconductor storage subsystem consisting of 2 channel devices, 2 SSU and 1 SSC. However this invention is not restricted to the embodiment stated above, but it can be applied to any semiconductor storage subsystem indicating a combination or arbitrary numbers of channel devices, SSUs and SSCs. Further the number of the maximum data transfer speeds of a plurality of devices constituting the system is not restricted to 2, but it may be greater than 2. Furthermore, this invention may be applied not only to the data transfer in a semiconductor storage subsystem but also to the data transfer in any system including a plurality of devices the data transfer thereof are variable or different.

I claim:

1. A computer system comprising:
    (a) at least one CPU which includes a channel device for transferring data at a speed variable within a predetermined range;
    (b) semiconductor storage devices having data transfer speeds variable within a predetermined range, respectively; and
    (c) a storage control device connected between said at least one CPU and said semiconductor storage devices for controlling data transfer therebetween;
    (d) said storage control device including first indication means for indicating a maximum data transfer speed of the channel device of said at least one CPU;
    (e) each semiconductor storage device of said semiconductor storage devices includes second indication means for indicating a maximum data transfer speed of said each semiconductor storage device; and
    (f) said storage control device further including transfer speed determining and setting means coupled to said first and second indication means and said at least one CPU for responding to a demand of data transfer issued from said at least one CPU to one of said semiconductor storage devices to read the maximum data transfer speed of the channel device of said at least one CPU indicated by said first indication means and the maximum data transfer speed of said one of said semiconductor storage devices indicated by said second indication means and to set a speed of data transfer between the channel device of said at least one CPU and said one of said semiconductor storage devices to the lower of said maximum data transfer speeds based on a comparison between said maximum data transfer speeds.

2. A computer system according to claim 1, wherein said storage control device includes means connected with said transfer speed determining and setting means for providing transfer clocks for data which are transferred between said at least one CPU and said semiconductor storage devices.

3. A computer system according to claim 2, wherein said first indication means of said storage control device has a circuit board including a connection line setting section for indicating the maximum data transfer speed of the channel device of said at least one CPU.

4. A computer system according to claim 3, wherein said second indication means of said each semiconductor storage device has a circuit board including a connection line setting section for indicating the maximum data transfer speed of said each semiconductor storage device.

5. A computer system according to claim 3, wherein said second indication means of said each semiconductor storage device, includes means for indicating coded information representative of the maximum data transfer speed of said each semiconductor storage device.

6. A data transfer speed control apparatus for controlling data transfer speeds between a plurality of devices in a system, wherein each device sends and receives data and has a different data transfer speed which varies within a predetermined range, said apparatus comprising:
  (a) first means for indicating a maximum data transfer speed of each of said plurality of devices;
  (b) second means for setting a data transfer speed for each of said plurality of devices; and
  (c) third means coupled to said first and second means for responding to a demand of data transfer between two of said plurality of devices to determine a speed of data transfer to be made between said two devices at the lower one of the maximum data transfer speeds of said two devices indicated by said first and second means based on a comparison between said maximum data transfer speeds.

7. A data transfer speed control apparatus according to claim 6, wherein said first means has connection line setting sections for setting codes representative of the maximum data transfer speeds of each of said plurality of devices.

8. A data transfer speed control apparatus according to claim 7, wherein said third means has means connected with the connection line setting sections corresponding to the two devices between which data transfer is to be made for selecting the lower one of the maximum data transfer speeds of said two devices as the speed of data transfer between said two devices.

9. A computer system according to claim 5, wherein said means for indicating coded information is a microswitch means.

10. A computer system according to claim 3, wherein jumper lines are mounted at those places of said connection line section of said first indication means which correspond to the specification of the channel device of said at least one CPU.

11. A computer system according to claim 4, wherein jumper lines are mounted at those places of said connection line section of said second indication means which correspond to the specification of the semiconductor storage device.

12. A computer system according to claim 3, wherein a group of microswitches are mounted on said connection line setting section of said first indication means and microswitches in the microswitch group corresponding to the maximum data transfer speed of the channel device of said at least one CPU are turned on.

13. A computer system according to claim 4, wherein a group of microswitches are mounted on said connection line setting section of said second indication means and microswitches in the microswitch group corresponding to the maximum data transfer speed of the semiconductor storage device are turned on.

* * * * *